3,058,977
TRICYANOVINYL DYES AND THEIR
PREPARATION
Blaine Chase McKusick and John Richard Roland, Wilmington, Del., assignors to E. I. du Pont de Nemours and Company, Wilmington, Del., a corporation of Delaware
No Drawing. Filed May 1, 1958, Ser. No. 732,130
4 Claims. (Cl. 260—240)

This invention is concerned with a new class of tricyanovinyl dyes and a process for their preparation.

In U.S. Patents 2,762,810 and 2,762,833 processes are described for preparing C-tricyanovinyl compounds, particularly C-tricyanovinyl aromatic amines and C-tricyanovinyl phenols. These C-tricyanovinyl compounds are highly colored and are useful for dyeing such materials as polyacrylonitrile and polyethylene terephthalate fibers when applied from neutral or acidic media. Heretofore, tricyanovinyl dyes which are stable for application from alkaline media have not been reported.

It is an object of this invention to provide new tricyanovinyl dyes and processes for their preparation. A further object is to provide a new class of dyes which are characterized by having a tricyanovinyl group attached to a carbocyclic aromatic ring or a heterocyclic ring of aromatic character and methods for their preparation. A still further object is to provide dyes which are characterized by improved stability for application under alkaline conditions. Other objects will appear hereafter.

These and other objects are obtained by providing tricyanovinylarylazomethine dyes wherein a tricyanovinyl group is attached to a carbocyclic aromatic ring or a heterocyclic ring of aromatic character. These new dyes fall into two classes: (1) those in which the tricyanovinyl group is on the nitrogen side of the azomethine (C=N) group, and (2) those in which the tricyanovinyl group is on the carbon side of the azomethine group. The arylene bridge between the tricyanovinyl group and the azomethine group has its bonds stemming from carbon atoms so arranged that if the carbon atom carrying the bond toward the azomethine group is counted as position 1, the tricyanovinyl group is bonded at position 4. In further characterization of the arylene group, it may be said that the corresponding aromatic compound which would be obtained by placing hydrogens at the respective bonds of the arylene group is a compound with a resonance energy of not less than 20 k cal./mole.

Resonance energies of organic compounds and the determination of resonance energies are shown by Linus Pauling in "The Nature of the Chemical Bond," second edition, Cornell University Press, 1945, pages 132–139.

The new compounds of this invention are referred to generically as tricyanovinylarylazomethine dyes and fall into two classes. These new classes can be represented by the following formulas:

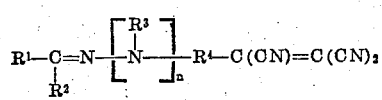
(1)

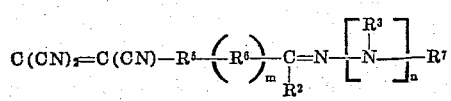
(2)

where $n$ and $m$ are the same or different and represent a cardinal number no greater than 1, i.e., zero or one; $R^1$ and $R^3$ are the same or different and represent a member of the group consisting of hydrogen and hydrocarbyl radicals (i.e., alkyl, cycloalkyl, aralkyl or aryl hydrocarbon); $R^2$ is of the group consisting of hydrogen, alkyl, cycloalkyl, aralkyl and aryl; $R^4$ is 1,4-arylene; $R^5$ is a member of the group consisting of 2,5-furylene and 2,5-pyrrylene; $R^6$ is vinylene; and $R^7$ is a member of the group consisting of aryl, hydroxy, alkoxy, carbamyl, thiocarbamyl and amidino.

The aryl moieties in $R^2$, $R^4$ and $R^7$ include carbocyclic aryl such as phenyl, naphthyl and anthryl, and heterocyclic aryl such as thienyl, pyrryl, indolyl, furyl, oxazolyl, pyridyl and quinolyl and substituted derivatives of these groups.

Substituents which are particularly useful in intensifying the color of the compounds illustrated by formulas above include —$NY_2$, —$NHY$, —$OY$, $SO_3H$, —$SO_3Y$, —$COOH$, —$COOY$, —$NO_2$, —$CN$ and halogens such as —F, —Cl and —Br where Y is hydrocarbyl, i.e., alkyl, cycloalkyl, aryl or aralkyl hydrocarbon. A particularly preferred group of dyes, because of their alkali stability, are those where $n$ is 1 and $R^3$ is hydrogen.

The process of this invention by which the above compounds are formed can be illustrated by the following equations:

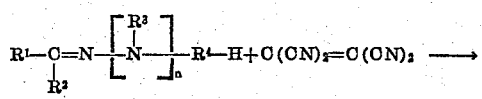

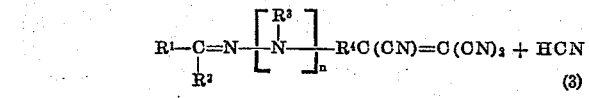
(3)

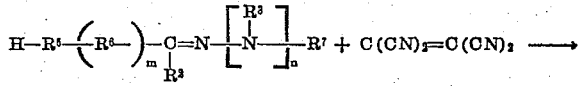

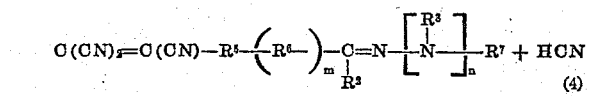
(4)

where $n$, $m$ and the R's are as defined in Formulas 1 and 2 above.

The reaction of this invention can be carried out by bringing together tetracyanoethylene and an arylazomethine as shown in Equations 3 and 4 above, preferably into intimate contact for an extended period of time, say of the order of about 1 minute up to 24 hours or more depending on the temperature employed. It is convenient to employ a liquid diluent which is chemically inert to the reactants and products since this facilitates carrying out the reaction.

The reaction can be carried out over a wide range of temperatures, i.e., from 0° C. to 150° C. and above. When it is desired to complete the reaction in a minimum time, it is convenient to heat the reaction mixture. Preferred reaction temperatures are in the range of 25–60° C. Pressure is not a critical factor in this process, and atmospheric pressure is accordingly preferred.

As liquid diluents for the practice of this invention there can be used N,N-dimethylformamide, N,N-diethylformamide, N-methylformanilide, N-methylformamide, formamide, N-methyl-N-ethylacetamide, N,N-dimethylacetamide, N,N-diethylacetamide, tetramethylurea, tetraethylurea, pyridine, dimethylsulfoxide and mixtures of these liquids. The dialkyl lower alkanoamides are the preferred class of solvents.

For practical yields of dyes, it is preferred to employ approximately equimolar quantities of tetracyanoethylene and the arylazomethine. However, the reaction will take place when the reactants are employed in any proportion, and molar ratios within the range of 1:2 to 2:1 are preferred.

In the following examples parts are by weight unless otherwise indicated. Example II represents a preferred embodiment of the invention.

EXAMPLE I

About five parts each of benzaldehyde phenylhydrazone and tetracyanoethylene are mixed with about 50 parts of pyridine. The mixture turns greenish yellow for a short time, due to the formation of the pi complex of tetracyanoethylene with pyridine. After warming the mixture at 60–100° C., this color quickly gives way to the deep magenta color of 2-phenyl-1-p-(tricyanovinyl)-anilinoazomethine which starts to form within a few seconds and is complete within a few minutes. Dilution of the reaction mixture with an excess of ethanol gives a blood red solution of the dye.

EXAMPLE II

The dye of Example I is prepared by mixing 38 parts of tetracyanoethylene and 59 parts of benzaldehyde phenylhydrazone in 94 parts of dimethylformamide. The mixture is warmed to 60° C. The exothermic reaction carries the temperature briefly to 80° C. The reaction mixture is cooled to 60° C. and held at that temperature for a total reaction time of ten minutes. The mixture is then cooled to 0° C., and reddish black crystals of 2-phenyl-1-p-(tricyanovinyl)anilinoazomethine are collected by filtration and recrystallized from glacial acetic acid.

*Anal.*—Calcd. for $C_{18}H_{11}N_5$: C, 72.8; H, 3.70; N, 23.60. Found: C, 72.7; H, 3.99; N, 23.13.

A spectrophotometric analysis of an acetone solution of this dye shows it to have an absorption maximum at 520 millimicrons with a molecular extinction coefficient of 46,300. The infrared absorption spectrum shows a NH band at 3.05 microns, a band for unsaturated CH at 3.25 microns, a band for conjugated cyano at 4.5 microns, and bands for unsaturated carbon-carbon and carbon-nitrogen at 6.2, 6.5 and 6.75 millimicrons.

EXAMPLE III

About five parts each of acetophenone phenylhydrazone and tetracyanoethylene in about 100 parts of dimethylformamide are warmed at 60–90° C. for several minutes. 2-methyl-2-phenyl-1-p-(tricyanovinyl)anilinoazomethine forms as a deep red dye.

EXAMPLE IV

About five parts each of benzophenone anil and tetracyanoethylene in about 100 parts of dimethylformamide are warmed at 60–90° C. for several minutes. 2,2-diphenyl-1-p-(tricyanovinyl)phenylazomethine forms a deep orange-red dye.

EXAMPLE V p-Dimethylaminobenzaldehyde phenylhydrazone (59 parts) and 32 parts of tetracyanoethylene are mixed with about 94 parts of dimethylformamide and heated at 50–60° C. For a brief period the heat of reaction carries the temperature to 90° C. It is maintained at 50–60° C. for the remainder of a total reaction time of ten minutes. The reaction mixture is cooled to 0° C. and filtered to recover dark green crystals of 2-p-dimethylaminophenyl-1-p-(tricyanovinyl)anilinoazomethine which show a golden iridescence when dried. An acetone solution of this compound is dark blue and shows absorption maxima at 580 millimicrons, molecular extinction coefficient 29,600, and at 360 millimicrons, molecular extinction coefficient 14,900.

*Anal.*—Calcd. for $C_{20}H_{16}N_6$: C. 70.6; H, 4.72; N, 24.4. Found: C, 70.25; H, 4.75; N, 24.6.

EXAMPLE VI

About five parts each of p-nitrobenzaledehyde phenylhydrazone and tetracyanoethylene are warmed in about 100 parts of dimethylformamide for ten minutes. 2-p-nitro-phenyl-1-p-(tricyanovinyl)anilinoazomethine is formed as a brilliant red dye.

EXAMPLE VII

One hundred parts of p-chlorobenzaldehyde phenylhydrazone and 56 parts of tetracyanoethylene in 94 parts of diethylformamide are warmed at 50–60° C. for ten minutes. The mixture is cooled to 0° C. and poured onto an agitated mixture of ice and water. Black crystals of 2-p-chlorophenyl-1-p-(tricyanovinyl)anilinoazomethine separate and are recrystallized from n-butyl alcolohl. The yield is 87 parts (60%) of nearly black crystals having a metallic luster. This dye melts at 304° C. An acetone solution of this dye is magenta and shows an absorption maximum at 520 millicrons with a molecular extinction coefficient of 48,000.

*Anal.*—Calcd. for $C_{18}H_{10}ClN_5$: Cl, 10.7; N, 21.15. Found: Cl, 9.43; N, 21.35.

EXAMPLE VIII

About five parts each of cinnamaldehyde phenylhydrazone and tetracyanoethylene in about 100 parts of dimethylformamide are warmed at 80–90° C. for five minutes. At the end of this time, reaction is complete and the solution is deep magenta in color. The dye formed is 2-styryl-1-p-(tricyanovinyl)anilinoazomethine. The absorption maximum of this dye is at a wave length between those for the dyes shown in Examples I and V.

EXAMPLE IX

About five parts each of phenyl(p-dimethylaminophenylmethylene)amine and tetracyanoethylene are warmed in about 100 parts of dimethylformamide. 2-p-dimethylamino-2-phenyl-1-p-(tricyanovinyl)phenylazomethine is formed as a deep orange-red dye.

EXAMPLE X

Piperonal phenylhydrazone (120 parts) and 64 parts of tetracyanoethylene are heated at 45–50° C. in 94 parts of dimethylformamide. 2-(3,4-methylenedioxyphenyl)-1-p-(tricyanovinyl)anilinoazomethine is formed as dark purple crystals having a metallic luster when dry. The yield is 107 parts (62%), and the dye melts at 265° C. An acetone solution of the dye shows an absorption maximum at 540 millimicrons with a molecular extinction coefficient of 45,300.

*Anal.*—Calcd. for $C_{19}H_{11}O_2N_5$: N, 20.52. Found: N, 20.05.

EXAMPLE XI

About five parts each of 1-naphthaldehyde phenylhydrazone and tetracyanoethylene are heated in about 100 parts of dimethylformamide. 2-(1-naphthyl)-1-p-(tricyanovinyl)-anilinoazomethine is formed as a deep blue-magenta dye with an absorption maximum near 590 millimicrons.

EXAMPLE XII

Veratraldehyde phenylhydrazone (223 parts) is dissolved in 472 parts of dimethylformamide and heated to 49° C. Finely powdered tetracyanoethylene (111 parts) is added portionwise with agitation while the reaction mixture is maintained at temperatures in the range of 40–50° C. When the reaction is complete, the mixture is cooled to 0° C. and filtered to recover glistening green crystals of 2-(3,4-dimethoxyphenyl)-1-p-(tricyanovinyl)-anilinoazomethine. The yield is 180 parts (58%). A portion of the dye recrystallized from butyl alsohol melts at 275° C. An additional 131 parts of 2-(3,4-dimethoxyphenyl) - 1 - p-(tricyanovinyl)anilinoazomethine, melting at 271° C., is obtained by precipitation of the original filtrate in ice. An acetone solution of this dye shows an absorption maximum at 542 millimicrons with a molecular extinction coefficient of 44,600.

Anal.—Calcd. for $C_{20}H_{15}O_2N_5$: C, 67.25; H, 4.21; N, 19.6. Found: C, 67.15; H, 4.61; N, 20.33.

EXAMPLE XIII

About five parts each of cuminicaldehyde phenylhydrazone and tetracyanoethylene are warmed in about 100 parts of dimethylformamide. 2-p-isopropylphenyl-1-p-(tricyanovinyl)-anilinoazomethine forms as a brilliant red-magenta dye.

EXAMPLE XIV p-Diethylaminobenzaldehyde phenylhydrazone (190 parts) and 567 parts of dimethylformamide are warmed at 50–55° C. and 910 parts of tetracyanoethylene is added portionwise. 2 - p - diethylaminophenyl - 1 - p - (tricyanovinyl)-anilinoazomethine separates in the form of dark green crystals which are recrystallized from normal butyl alcohol. The dye has a metallic luster when dry and melts at 267° C. An acetone solution of the dye shows absorption maxima at 592 millimicrons (molecular extinction coefficient, 41,200), 419 millimicrons (molecular extinction coefficient, 7,160), and 368 millimicrons (molecular extinction coefficient, 22,100).

Anal.—Calcd. for $C_{22}H_{20}N_6$: C, 71.75; H, 5.43; N, 22.82. Found: C, 72.06; H, 5.79; N, 22.10.

EXAMPLE XV

To 16.2 parts of N-butyraldehyde phenylhydrazone in 20 parts of dimethylformamide is added 12.8 parts of tetracyanoethylene. The tetracyanoethylene is added portionwise over a period of about 10 minutes. The reaction mixture is cooled and agitated to maintain the temperature at 45–50° C. The dye is precipitated by pouring the reaction mixture onto well-stirred, finely-ground ice. 2-propyl-1-p-(tricyanovinyl)anilinoazomethine is obtained as a bright red dye.

EXAMPLE XVI

Furfural phenylhydrazone (18.6 parts) and 12.8 parts of tetracyanoethylene are condensed in dimethylformamide solution at 28–33° C. The mixture is then poured into crushed ice. 1-anilino-2-(5-tricyanovinyl-2-furyl)-azomethine which separates is filtered off and recrystallized from butyl alcohol. This yields 14.2 parts of green crystals melting at 249° C. The yield is 49.5% of the theoretical. An acetone solution of this dye has an absorption maximum at 588 millimicrons and a molecular extinction coefficient of 32,400.

Anal.—Calcd. for $C_{16}H_9ON_5$: C, 66.9; H, 3.14; N, 24.39. Found: C, 67.49; H, 3.52; N, 24.51.

EXAMPLE XVII

Formaldehyde phenylhydrazone (1.5 parts) and 1.6 parts of tetracyanoethylene are condensed in 20 parts of dimethylformamide while stirring and warming the mixture at 40–45° C. 1-p-(tricyanovinyl)anilinoazomethine is formed as a bright red dye.

EXAMPLE XVIII p-Dimethylaminobenzaldehyde methylphenylhydrazone (22.6 parts) and 11.4 parts of tetracyanoethylene are condensed by warming in 100 parts of dimethylformamide at 48–50° C. The reaction mixture is cooled at 0° C. overnight and the solid filtered. This yields a blue crystalline precipitate of 2-p-dimethylaminophenyl - 1 - N - methyl-p-(tricyanovinyl)anilinoazomethine which is recrystallized from acetic acid (yield 1.6 parts). The filtrate is stirred into ice, and additional 2-p-dimethylaminophenyl-1-N-methyl - p - (tricyanovinyl)anilinoazomethine which separates is recrystallized from butyl alcohol. (Yield 17.9 parts.) This dye melts at 280° C. and an acetone solution has absorption maxima at 360 and 590 millimicrons with molecular extinction coefficients of 23,300 and 32,200, respectively.

Anal.—Calcd. for $C_{21}H_{18}N_6$: C, 71.2; H, 5.08; N, 23.7. Found: C, 70.80; H, 5.18; N, 25.81.

EXAMPLE XIX

α-Thenaldehyde phenylhydrazone (10.1 parts) and 6.4 parts of tetracyanoethylene are condensed by stirring and heating at 45–55° C. in 10 parts of dimethylformamide. The reaction mixture is cooled at 0° C. overnight and filtered. The solid 2-(2-thienyl) - 1 - p - (tricyanovinyl)-anilinoazomethine obtained is recrystallized from acetic acid. This yields 0.4 part of magenta crystals. The filtrate from the dye is poured into a mixture of ice and water. The solid 2-(2 - thienyl) - 1 - p - (tricyanovinyl)-anilinoazomethine obtained is filtered and recrystallized from butyl alcohol. This yields 10.2 parts of dye melting at 270° C. An acetone solution of the dye has an absorption maximum at 535 millimicrons, molecular extinction coefficient of 41,500.

Anal.—Calcd. for $C_{16}H_9SN_5$: C, 63.48; H, 2.97; N, 23.1. Found: C, 64.00; H, 3.27; N, 23.26.

EXAMPLE XX

To a solution of 19.5 parts of trifluoroacetaldehyde phenylhydrazone in dimethylformamide there is added 11.3 parts of tetracyanoethylene in small portions. At the start the reaction is exothermic and the temperature increases to 40° C. 1-p-(tricyanovinyl)anilino-2-trifluoromethylazomethine separates as a bright orange-yellow dye.

EXAMPLE XXI

To a dimethylformamide (20 parts) solution of 5.95 parts of glyoxalphenylosazone there is added 3.2 parts of tetracyanoethylene at 40–42° C. This reaction forms a mixture of 2-phenylhydrazonomethyl - 1 - p - (tricyanovinyl)-anilinoazomethine and 2,2'-bis - (1 - p - [tricyanovinyl]anilinoazomethine) as a deep, rich purple dye. The mixture is precipitated by pouring into a stirred mixture of ice and water. The dye is recrystallized from ethyl alcohol. This yields 5 parts of dark blue dye. An acetone solution of this dye has absorption maxima at 362 and 560 millimicrons with molecular extinction coefficients of 21,000 and 38,600 respectively.

EXAMPLE XXII

Pyridine-3-carboxaldehyde phenylhydrazone (8.6 parts)

is dissolved in 25 parts of dimethylformamide. This solution is stirred at 40–45° C. while adding 6.4 parts of tetracyanoethylene. The reaction mixture is cooled and filtered. The precipitate is recrystallized from acetic acid; this yields 1.9 parts of 2-(3-pyridyl)-1-p-(tricyanovinyl)-anilinoazomethine melting at 231–233° C. The filtrate is precipitated by pouring into stirred ice and water. This yields an additional fraction which is recrystallized from butyl alcohol. This yields an additional 1.8 parts of dye. This dye has an absorption maximum at 512 millimicrons, extinction coefficient 27,400.

*Analysis.*—Calcd. for $C_{17}H_{10}N_6$: C, 68.5; H, 3.36; N, 28.2. Found: C, 68.60; H, 3.50; N, 27.60.

EXAMPLE XXIII

To a solution of 55 parts of acetophenone phenylhydrazone in 142 parts of dimethylformamide at 40–50° C. 33.5 parts of tetracyanoethylene is added in small portions over a period of 20 minutes. Heating is continued for another 10 minutes. The mixture is cooled overnight and triturated with acetic acid. 2-methyl-2-phenyl-1-p-(tricyanovinyl)anilinoazomethine separates as a deep red dye and is collected by filtration. One portion is recrystallized from acetic acid and another portion from n-butyl alcohol. The yields are 15 parts and 11 parts respectively, both melting at 276° C. An additional 12 parts (M.P. 277° C.) is recovered from the residues, making a combined yield of 46.7% of the theoretical value. An acetone solution of this dye has an absorption maximum at 526 millimicrons, extinction coefficient of 42,200. This dye shows indicator action in changing from magenta to deep blue on addition of sodium hydroxide or other base. The reverse color occurs on addition of acid.

*Analysis.*—Calcd. for $C_{19}H_{13}N_5$: C, 72.5; H, 4.32; N, 23.2. Found: C, 72.85; H, 4.23; N, 23.69.

EXAMPLE XXIV

A solution of 74 parts of acetone phenylhydrazone in 95 parts of dimethylformamide is prepared and warmed to 35° C. To this there are added 64 parts of tetracyanoethylene in small portions over a period of 20 minutes. The reaction is mildly exothermic, and the mixture is intermittently cooled to maintain the temperature at 30–40° C. 2,2-dimethyl-1-p-(tricyanovinyl)anilinoazomethine is formed as a bright orange-red dye. The reaction mixture is stirred into a mixture of 1000 parts of finely chopped ice and a little water. This crude dye has absorption maxima at 511 and 380 millimicrons, extinction coefficients of 2860, 3190; and melts at 100–137° C.

EXAMPLE XXV

*Part A.—Preparation of 1-Formyl-2-(p-Tricyano-vinylphenyl)Hydrazine*

A solution of 13.6 parts of 1-formyl-2-phenylhydrazine in 24 parts of dimethyformamide is prepared. This solution is stirred at 25–30° C. while 12.8 parts of tetracyanoethylene is added over a period of 15 minutes. The mixture is allowed to stir an additional 15 minutes at 25–30° C. The reaction mixture is then poured onto 300 parts of ice containing about 10 parts of glacial formic acid. After the ice has melted, the aqueous top layer is decanted. The remaining viscous mass is triturated with glacial formic acid until solidification occurs. The solid is filtered out and recrystallized from ethyl alcohol. This yields 4.3 parts of 1-formyl-2-(p-tricyanovinylphenyl)-hydrazine, melting with decomposition on a block at 215–216° C. An acetone solution of this product shows an absorption maximum at 460 millimicrons with a molecular extinction coefficient of 27,400.

*Anal.*—Calcd. for $C_{12}H_7N_5O$: N, 29.55. Found: N, 29.51.

Part B

A mixture of 23 parts of 1-formyl-2-(tricyanovinylphenyl)hydrazine and 15 parts of benzaldehyde is heated to reflux for 25 minutes in 1580 parts of alcohol plus 500 parts of water plus 25 parts of concentrated aqueous hydrochloric acid. After about 12 minutes the red-brown color due to the formyl hydrazide changes to a bright magenta. The reaction mixture is cooled slightly and poured onto a well-stirred mixture of 10,000 parts of ice. After the ice melts, the solid dye is collected on a filter and recrystallized from n-butyl alcohol. This yields 20 parts of 2-phenyl-1-p-(tricyanovinyl)anilinoazomethine which is identical with the product of Example II. The identity of the two dyes is established by identity of their infrared and visible absorption spectra.

EXAMPLE XXVI

A mixture of 23 parts of 1-formyl-2-(p-tricyanovinylphenyl)hydrazine and 15 parts of p-dimethylaminobenzaldehyde is refluxed in 1580 parts of alcohol, 500 parts of water, and 25 parts of concentrated aqueous hydrochloric acid for 20 minutes. The dye is isolated and recrystallized as in Example XXV, Part B. This yields 28 parts of 2-p-dimethylaminophenyl-1-p(tricyanovinyl)anilinoazomethine, a blue dye which is shown by infrared and visible spectroscopy to be identical with the dye described in Example V.

EXAMPLE XXVII

A mixture of 23 parts of 1-formyl-2-(p-tricyanovinylphenyl)hydrazine and 15 parts of furfural is refluxed in aqueous alcohol containing hydrochloric acid as in Example XXVI. The dye is isolated and recrystallized as described in Example XXV, Part B. This yields 26 parts of 2-(2-furyl)-1-p-(tricyanovinyl)anilinoazomethine having an absorption maximum at 530 millimicrons and a molecular extinction coefficient of 43,000.

*Analysis.*—Calcd. for $C_{16}H_9N_5O$: C, 66.9; H, 3.14; N, 24.39. Found: C, 67.08; H, 3.36; N, 22.54.

The infrared absorption spectrum of this dye differs from that of the dye of Example XVI. These have significant differences throughout the spectrum. In particular, the product of Example XXVII has strong infrared absorption bands at 832 and 750 cm.$^{-1}$ showing para-substituted phenyl, confirmed by weaker bands at 1015, 1072, 1102, 1182 cm.$^{-1}$. In contrast, the product of Example XVI has strong infrared absorption bands at 753 and 691 cm.$^{-1}$ characteristic of monosubstituted phenyl and confirmed by weaker bands at 1028, 1068, and 1163 cm.$^{-1}$.

EXAMPLE XXVIII

A mixture of 23 parts of 1-formyl-2-(p-tricyanovinylphenyl)hydrazine and 13 parts of β-(2-furyl)acrolein is condenser by refluxing in aqueous alcohol containing hydrochloric acid and worked up as in Example XXV, Part B. This yields 21 parts of 2-β-(2-furyl)vinyl-1-p-(tricyanovinyl)anilinoazomethine, a purple dye which in acetone solution shows an absorption maximum at 545 millimicrons and a molecular extinction coefficient of 50,100.

EXAMPLE XXIX

A mixture of 23 parts of 1-formyl-2-(p-tricyanovinylphenyl)hydrazine and 15 parts of indole-3-carboxaldehyde is condensed and worked up as in Example XXV, Part B. This yields 33 parts of 2-(3-indolyl)-1-p-tricyanovinyl)anilinoazomethine. An acetone solution of this dye has an absorption maximum at 573 millimicrons and a molecular extinction coefficient of 43,300.

*Anal.*—Calcd. for $C_{20}H_{12}N_6$: C, 71.4; H, 3.57; N, 25.0. Found: C, 71.4; H, 3.88; N, 24.51.

EXAMPLE XXX

Reaction of 50 parts of indole-3-carboxyaldehyde phenylhydrazone and 27 parts of tetracyanoethylene in 95 parts of dimethylformamide at 40–45° C. for 20 minutes yields 20 parts of 2-(3-indolyl)-1-p-(tricyanovinyl)anilinoazomethine in the form of a bright blue dye having infrared and visible spectra identical with the spectra of the product of Example XXIX.

EXAMPLE XXXI

A mixture of 23 parts of 1-formyl-2-(p-tricyanovinylphenyl)hydrazine and 12 parts of salicylaldehyde is condensed and worked up as in Example XXV, Part B. This yields 16 parts of 2-o-hydroxyphenyl-1-p-(tricyanovinyl)anilinoazomethine in the form of a purple dye having an absorption maximum at 520 millicrons and a molecular extinction coefficient of 44,400.

EXAMPLE XXXII

A solution of 188 parts of salicyladlehyde phenylhydrazone and 128 parts of tetracyanoethylene in 570 parts dimethylformamide is stirred and heated at 45–50° C. for about 20 minutes. The reaction mixture is precipitated by pouring onto well-stirred ice. The precipitated dye is recrystallized from n-butyl alcohol. This yields 123 parts of 2-o-hydroxyphenyl-1-p-(tricyanovinyl)-anilinoazomethine. The infrared and visible spectra are identical with those of the product of Example XXXI.

Anal.—Calcd. for $C_{18}H_{11}N_5O$: C, 69.0; H, 3.52; N, 22.35. Found: C, 68.69; H, 3.54; N, 21.75.

EXAMPLE XXXIII

A mixture of 23 parts of 1-formyl-2-(p-tricyanovinylphenyl)hydrazine and 10 parts (excess) of n-butyraldehyde is condensed and worked up as in Example XXV, Part B. This yields 17 parts of 2-propyl-1-p-(tricyanovinyl)anilinoazomethine, a bright red dye having an absorption maximum at 508 millimicrons and a molecular extinction coefficient of 42,600. The product is identical to the product of Example XV.

Anal.—Calcd. for $C_{15}H_{13}N_5$: C, 68.5; H, 4.95; N, 26.6. Found: C, 69.10; H, 5.07; N, 25.67.

EXAMPLE XXXIV

β-2-(furyl)acrolein phenylhydrazone (210 parts) is dissolved in 945 parts of dimethylformamide; 128 parts of tetracyanoethylene is added and the mixture is allowed to stand at room temperature for 2 hours. During this time reddish-brown crystals of 1-anilino-2-[β-(5-tricyanovinyl-2-furyl)]vinylazomethine separate. These crystals are separated by filtration, washed in ethyl acetate and dried. The yield is 158 parts. An acetone solution of this dye is blue and shows an absorption maximum at 615 millimicrons. The dye melts at 150° C. when heated rapidly, but decomposes below 150° C. when heated slowly.

When the following arylazomethine compounds are treated with tetracyanoethylene in dimethylformamide solution in the manner of Example III, the indicated tricyanovinylarylazomethines are obtained.

TABLE I

| Arylazomethine Starting Material | Tricyanovinylarylazomethine Product |
|---|---|
| 9-anthraldehyde phenylhydrazone. | 2-(9-anthryl)-1-p-(tricyanovinyl)-anilinoazomethine. |
| 3-indoleacetaldehyde phenylhydrazone. | 2-(3-indolylmethyl)-1-p-(tricyanovinyl)anilinoazomethine. |
| 2-pyridinecarboxaldehyde phenylhydrazone. | 2-(2-pyridyl)-1-p-(tricyanovinyl)-anilinoazomethine. |
| glucose phenylosazone | 2-(1-phenylhydrazono-2,3,4,5-tetrahydroxyamyl)-1-p-(tricyanovinyl)anilinoazomethine. |
| 4-dimethylamino-1-naphthaldehyde phenylhydrazone. | 2-(4-dimethylamino-1-naphthyl)-1-p-(tricyanovinyl)anilinoazomethine. |
| 2,4-dimethoxybenzaldehyde phenylhydrazone. | 2-(2,4-dimethoxyphenyl)-1-p-(tricyanovinyl)anilinoazomethine. |
| 2,4-bisdimethylaminobenzaldehyde phenylhydrazone. | 2-(2,4-bisdimethylaminophenyl)-1-p-(tricyanovinyl)anilinoazomethine. |
| p-dodecylbenzaldehyde phenylhydrazone. | 2-(p-dodecylphenyl)-1-p-(tricyanovinyl)anilinoazomethine. |
| 1-anilino-2-(1,3,3-trimethyl-2-indolylidenemethyl)azomethine. | 1-p-(tricyanovinyl)anilino-2-(1,3,3-trimethyl-2-indolylidenemethyl)azomethine. |
| hexahydrobenzaldehyde phenylhydrazone. | 2-cyclohexyl-1-p-(tricyanovinyl)-anilinoazomethine. |
| cyclopropanecarboxaldehyde phenylhydrazone. | 2-cyclopropyl-1-p-(tricyanovinyl)-anilinoazomethine. |
| p-methylaminobenzaldehyde phenylhydrazone. | 2-p-methylaminophenyl-1-p-(tricyanovinyl)anilinoazomethine. |
| p-dibenzylaminobenzaldehyde phenylhydrazone. | 2-p-dibenzylaminophenyl-1-p-(tricyanovinyl)anilinoazomethine. |
| p-(β-cyanoethylmethylamino)benzaldehyde phenylhydrazone. | 2-p-(β-cyanoethylmethylamino)-phenyl-1-p-(tricyanovinyl)anilinoazo-methine. |
| p-(β-benzoyloxyethylmethylamino)benzaldehyde phenylhydrazone. | 2-p-(β-benzoyloxyethylmethylamino)phenyl-1-p-(tricyanovinyl), anilinoazomethine. |
| 4-methoxybenzaldehyde-3-sulfonic acid phenylhydrazone. | 2-(4-methoxy-3-sulfophenyl)-1-p-(tricyanovinyl)anilinoazomethine. |
| phenylhydrazone of ethyl ester of benzaldehyde-o-sulfonic acid. | 2-(2-ethoxysulfonylphenyl)-1-p-(tricyanovinyl)anilinoazomethine. |
| terephthalaldehydic acid phenylhydrazone. | 2-(p-carboxyphenyl)-1-p-(tricyanovinyl)anilinoazomethine. |
| phenylhydrazone of methyl ester of terephthalaldehydic acid. | 2-p-(methoxycarbonyl)phenyl-1-p-(tricyanovinyl)anilinoazomethine. |
| quinoline-2-carboxaldehyde phenylhydrazone. | 2-(2-quinolyl)-1-p-(tricyanovinyl)-anilinoazomethine. |
| isoxazole-3-carboxaldehyde phenylhydrazone. | 2-(3-isoxazolyl)-1-p-(tricyanovinyl) anilinoazomethine. |
| cyclohexanone phenylhydrazone | p-(tricyanovinyl)phenylhydrazonocyclohexane. |
| furfuraldehyde semicarbazone | 2-(5-tricyanovinyl-2-furyl)-1-ureidoazomethine. |
| furfuraldehyde oxime | 1-hydroxy-2-(5-tricyanovinyl-2-furyl)azomethine. |
| pyrrole-2-carboxaldehyde p-chlorophenylhydrazone. | 1-p-chloroanilino-2-(5-tricyanovinyl-2-pyrrolyl)azomethine. |
| pyrrole-2-carboxaldehyde O-methyloxime. | 1-methoxy-2-(5-tricyanovinyl-2-pyrrolyl)azomethine. |
| pyrrole-2-carboxaldehyde thiosemicarbazone. | 1-thioureido-2-(5-tricyanovinyl-2-pyrrolyl)azomethine. |
| hexafluorocyclobutanone phenylhydrazone. | p-(tricyanovinyl)phenylhydrazonohexafluorocyclobutane. |

The compounds of this invention have been named as tricyanovinylarylazomethines since this expression recites generically the whole structure which is common to all of these compounds. Following the customary precedence of atoms in numbering an organic compound, the nitrogen atom of the azomethine group is numbered 1 and the carbon atom is numbered 2. However, there are other methods for naming these compounds which might be equally satisfactory. For example, the products may be regarded as substituted hydrazines. Thus the product of Example I might be named 1-benzylidene-2-p-(tricyanovinyl)phenylhydrazine.

Since the tricyanovinyl group is common to all these compounds, it would also be suitable to name the products as derivatives of ethylenetricarbonitrile. Thus the product of Example I might be named p-(benzylidenehydrazino)phenylethylenetricarbonitrile.

The structure of the tricyanovinylarylazomethines of this invention is illustrated by the following test.

An alcoholic solution of 0.5 g. of 2-phenyl-1-p-tricyanovinyl)anilinoazomethine is refluxed overnight with 0.5 g. of 2,4-dinitrophenylhydrazine and 2 ml. of concentrated hydrochloric acid. The reaction mixture is cooled in ice and filtered. This yields a brownish red, needle-shaped solid weighing 0.23 g. After air-drying, it is found to melt sharply at 238° C. A mixed melting point with authentic benzaldehyde 2,4-dinitrophenylhydrazone is 238–239° C. Recrystallization from alcohol gives no change in color, and the melting point is 238–239° C. From this it is evident that the hydrazine of the dye molecule interchanges with 2,4-dinitrophenylhydrazine according to the following equation:

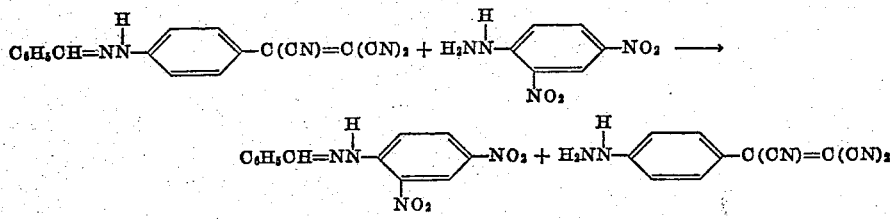

The p-tricyanovinylhydrazine portion of the dye is tentatively identified by reaction of the mother liquor from the above hydrazine interchange with a small amount of p-dimethylaminobenzaldehyde. A drop of this reaction mixture is chromatographed on paper. This separates the bright blue dye of Example V from the other material. This shows an alternative synthesis of tricyanovinyl dyes according to the equation:

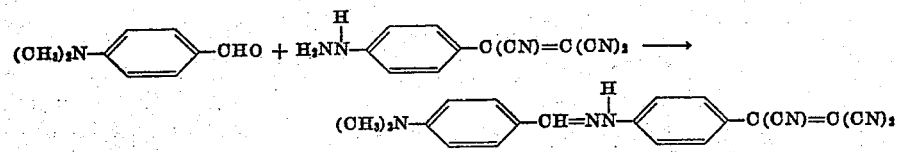

The use of the tricyanovinylarylazomethines of this invention as dyes is illustrated as follows:

DYEING EXAMPLE A

One-half part of 2-phenyl-1-p-(tricyanovinyl)analinoazomethine, prepared as shown in Example II, is dissolved in 25 parts of acetone and poured into 200 parts of water containing 5 parts of glacial acetic acid. Skeins of polyethylene terephthalate and cellulose acetate yarns are immersed in the resulting dye bath and heated at 100° C. for 30 minutes. The skeins are then washed in running water for 30 minutes and washed three times with soap until the suds no longer show color. The polyethylene terephthalate yarn is dyed a pale red-orchid color, and the cellulose acetate yarn is dyed a bright magenta color.

DYEING EXAMPLE B

One-half part of 2-p-dimethylaminophenyl-1-p-(tricyanovinyl)anilinoazomethine is dissolved in 50 parts of acetone and poured into 200 parts of water containing about 10% acetic acid. Skeins of polyethylene terephthalate and cellulose acetate yarns are immersed in this dye bath and heated at 100° C. for one hour. The polyethylene terephthalate is dyed a pale blue, and the cellulose acetate is dyed a dull blue color.

DYEING EXAMPLE C

A dye bath is prepared by pouring a solution of 0.05 part of 2-phenyl-1-p-(tricyanovinyl)anilinoazomethine in 10 parts of acetone into a well-stirred solution of 200 parts of water and 50 parts of an aqueous solution of a sulfonated lignin dispersant ("Marasperse," Marathon Company) containing 0.001 part of dispersant per part of water. Swatches of cellulose acetate, cotton, polyethylene terephthalate, and nylon fabrics are immersed in the dye bath and heated at 80–90° C. for one hour. The cellulose acetate is dyed a bright magenta color; the cotton is dyed a pale pink; the polyethylene terephthalate is dyed a dark pink; and the nylon is dyed a deep violet color.

DYEING EXAMPLE D

A dye bath is prepared as in dyeing C except that the dye employed is 2-p-dimethylaminophenyl-1-p-(tricyanovinyl)anilinoazomethine. This dye bath dyes cellulose acetate and polyethylene terephthalate fabrics a blue color and nylon fabric a deep blue-green color.

DYEING EXAMPLE E

The dyes indicated in Table II are applied to polyethylene terephthalate by the following procedure. A paste is made from 1.8 parts of dye and about 1.8 parts of dimethylformamide. The paste is dissolved in sufficient water and acid to give a total dye bath of 180 parts (1% dye) at pH 4.5. Five parts of polyethylene terephthalate fiber is added to the bath and the temperature is raised to 120° C. for one hour by heating in a metal bomb at 15 lbs. pressure. The fabric is removed from the bomb, rinsed and dried, and the color is observed.

TABLE II

| Dye | Color on Polyethylene Terephthalate |
|---|---|
| 2-p-dimethylaminophenyl-1-p-(tricyanovinyl)-anilinoazomethine. | light blue. |
| 2-p-(β-cyanoethylmethylamino)phenyl-1-p-(tricyanovinyl)-anilinoazomethine. | light reddish-blue. |
| 1-anilino-2-(5-tricyanovinyl-2-furyl)azomethine. | strong blue. |
| 2-(2-thienyl)-1-p-(tricyanovinyl)anilinoazomethine. | red-violet. |
| 2-(p-tolyl)-1-p-(tricyanovinyl)anilinoazomethine. | blue-red. |

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. 2-phenyl-1-p-(tricyanovinyl)anilinoazomethine.
2. 2-p-dimethylaminophenyl-1-p-(tricyanovinyl)-anilinoazomethine.
3. 1-(anilino-2-(5-tricyanovinyl-2-furyl)-azomethine.
4. Tricyanovinylarylazomethines selected from the group consisting of I and II, wherein I is of the formula

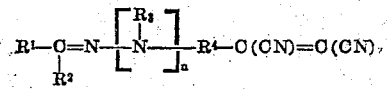

wherein $n$ is a cardinal number selected from the group consisting of zero and one; $R^1$ is selected from the group consisting of hydrogen and phenyl; $R^2$ is selected from the group consisting of hydrogen, lower alkyl, monocylic cycloalkyl, phenyl, naphthyl, anthryl, thienyl, pyrryl, indolyl, furyl, oxazolyl, and quinolyl; $R^3$ is selected from the group consisting of hydrogen and methyl; and, $R^4$ is unsubstituted phenylene; and, wherein II is of the formula

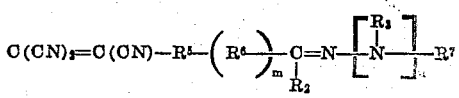

wherein $R^2$, $R^3$ and $n$ have the same significance as above; $m$ is a cardinal number selected from the group consisting of zero and one; $R^5$ is selected from the group consisting of unsubstituted 2,5-furylene and unsubstituted 2,5-pyrrylene; $R^6$ is vinylene and $R^7$ is selected from the group consisting of phenyl, p-chlorophenyl, hydroxy, lower alkoxy, carbamyl and thiocarbamyl.

References Cited in the file of this patent

UNITED STATES PATENTS 2,762,810   Heckert _____ Sept. 11, 1956
2,889,335   Heckert _____ June 2, 1959

OTHER REFERENCES

Bergmann: The Chemistry of Acetylene and Related Compounds, pp. 79–80, Interscience Publishers Inc., New York (1948).

Taylor et al.: Journal of the American Chemical Soc., vol. 81, pp. 2456–2464 (1959).